(12) United States Patent
Beer et al.

(10) Patent No.: US 7,927,675 B2
(45) Date of Patent: Apr. 19, 2011

(54) RECORDING SHEETS FOR INK JET PRINTING

(75) Inventors: Robert Beer, Marly (CH); Rolf Steiger, Le Mouret (CH); Vincent Ruffieux, Le Mouret (CH); Dipanjan Banerjee, Grenoble (FR); Gerhard Furrer, Zürich (CH); Daniel Rentsch, Zürich (CH); Björn Studer, Winterthur (CH)

(73) Assignee: Ilford Imaging Switzerland GmbH (CH)

( * ) Notice: Subject to any disclaimer, the term of this patent is extended or adjusted under 35 U.S.C. 154(b) by 0 days.

(21) Appl. No.: 12/229,024

(22) Filed: Aug. 19, 2008

(65) Prior Publication Data

US 2009/0061122 A1    Mar. 5, 2009

Related U.S. Application Data

(63) Continuation-in-part of application No. 10/934,281, filed on Sep. 3, 2004, now abandoned.

(30) Foreign Application Priority Data

Sep. 8, 2003  (EP) .................................. 03405650

(51) Int. Cl.
B41M 5/40    (2006.01)

(52) U.S. Cl. ............... 428/32.16; 428/32.21; 428/32.24; 428/32.26; 428/32.27; 428/32.28; 428/32.3; 428/32.38; 428/32.25

(58) Field of Classification Search ............... 428/32.16, 428/32.21, 32.24, 32.25, 32.26, 32.27, 32.28, 428/32.3, 32.38
See application file for complete search history.

(56) References Cited

U.S. PATENT DOCUMENTS

| | | | |
|---|---|---|---|
| 3,007,878 | A | 11/1961 | Alexander et al. |
| 5,055,019 | A | 10/1991 | Meyer et al. |
| 6,156,419 | A | 12/2000 | Brugger et al. |
| 2002/0064634 | A1 | 5/2002 | Baettig et al. |
| 2002/0164459 | A1 | 11/2002 | Steiger |
| 2003/0072925 | A1 * | 4/2003 | Kiyama et al. ................. 428/195 |
| 2003/0081103 | A1 | 5/2003 | Ishimaru et al. |
| 2004/0146665 | A1 | 7/2004 | Beer et al. |
| 2009/0061122 | A1 * | 3/2009 | Beer et al. ................... 428/32.16 |

FOREIGN PATENT DOCUMENTS

| | | |
|---|---|---|
| DE | 38 23 895 C1 | 12/1989 |
| DE | 100 20 346 A1 | 11/2000 |
| EP | 0 559 324 A1 | 9/1993 |
| EP | 0 685 345 A1 | 12/1995 |
| EP | 0 875 394 A1 | 11/1998 |
| EP | 1 197 345 A1 | 4/2002 |
| EP | 1 231 071 A1 | 8/2002 |
| EP | 1 437 228 A1 | 7/2004 |
| JP | 2000-309157 | 11/2000 |
| JP | 2001-096897 | 4/2001 |

OTHER PUBLICATIONS

"Aerosil 200 MSDS" Science Lab.Com.*
"Abrasives to Aluminum Oxide" Ullmann's Encyclopedia of Industrial Chemistry 5th Ed., 538-540, 1985, ISBN 0-89573-757-7.
"$Al_{30}$: A Giant Aluminium Polycation" Angewandte Chemie 112, 521-524 (2000).
"Aluminum Chlorohydrate Solution" Product Description, Gulbrandsen Technologies, Clinton, New Jersey. (2002).
"Aqueous Polynuclear Aluminum Species" The Environmental Chemistry of Aluminum, 117-168, CRC Press, 2nd Edition, 1996, ISBN 1-56670-030-2.
"Data Sheet for CAB-O-SIL® M-5" Cabot Corporation (2006).
"On the Crystal Structure of some Basic Aluminium Salts" Acta Chemica Scandinavica 14, 771-773 (1960).
"On the Crystal Structure of the Basic Aluminium Sulfate 13 $Al_2O_3$ 6 $SO_3 \times H_2O$" Arkiv för kemi 20, 321-342 (1963).
"Ozone Problem with Epson Photo Paper" Hardcopy Supplies Journal 6 (7), 35-36 (2000).
"Polyaluminum Chlorides" Kirk-Othmer Encyclopedia of Chemical Technology vol. 2, 338-345, 1992, ISBN 0-471-52670-3.
"Speciation and Thermal Transformation in Alumina Sols: Structures of the Polyhydroxyoxoaluminum Cluster $[Al_{30}O_8(OH)_{56}(H_2O)_{26}]^{18+}$ and its δ-Keggin Moieté" Journal of the American Chemical Society 122, 3777-3778 (2000).
"Sol-Gel Science" Academic Press, 1990, ISBN 0-12-134970-5.
"Technical Data Sheet for Mowiol®" Kuraray Europe GmbH (2007).
"The Crystal Structure of a Basic Aluminium Selenate" Arkiv för kemi 20, 305-319 (1963).

* cited by examiner

*Primary Examiner* — Betelhem Shewareged

(74) *Attorney, Agent, or Firm* — Onofrio Law; Dara L. Onofrio, Esq

(57) ABSTRACT

A recording sheet for ink jet printing is provided, which consists of a support having coated thereon at least one ink-receiving layer consisting of binders and at least one nanoporous inorganic compound, wherein the recording sheet contains a polynuclear aluminum hydroxo complex with 30 aluminum atoms. In a preferred embodiment, the surface of the nanoporous inorganic compound is modified by a treatment with the aluminum hydroxo complex with 30 aluminum atoms.

20 Claims, No Drawings

RECORDING SHEETS FOR INK JET PRINTING

This application is a continuation-in part of Ser. No. 10/934,281 filed on Sep. 3, 2004, now abandoned which is incorporated in it's entirety herein by reference.

FIELD OF THE INVENTION

The present invention relates to recording sheets used in ink jet printing consisting of a support having coated thereon at least one ink-receiving layer consisting of binders and at least one nanocrystalline, nanoporous inorganic compound, wherein the recording sheet contains the polynuclear aluminum hydroxo complex with 30 aluminum atoms, and to coating compositions for the preparation of such recording sheets.

BACKGROUND OF THE INVENTION

Ink jet printing processes are mainly of two types: continuous stream and drop-on-demand.

In continuous stream ink jet printing systems, a continuous ink stream is emitted under pressure through a nozzle. The stream breaks up into droplets at a certain distance from the nozzle. If a specific location on the recording sheet has to be printed the individual droplets are directed to the recording sheet, otherwise they are directed to a collecting vessel. This is done for example by charging unnecessary droplets in accordance with digital data signals and passing them through an static electric field which adjusts the trajectory of these droplets in order to direct them to the collecting vessel. The inverse procedure may also be used wherein uncharged droplets are collected in the vessel.

In the non-continuous process, or the so-called "drop-on-demand" systems, a droplet is generated and expelled from the nozzle in accordance with digital data signals only if a specific location on the recording sheet has to be printed.

The printing speed of modern ink jet printers is ever increasing for economical reasons. Recording sheets suitable for these printers therefore need to absorb the inks very quickly. Especially suitable are recording sheets containing nanocrystalline, nanoporous inorganic compounds, preferably oxides such as aluminum oxides or silicium dioxide, or oxide/hydroxides such as aluminum oxide/hydroxides.

Such recording sheets available today do not meet all of the required demands. In particular, the light stability and the storage stability of images printed on these recording sheets have to be improved. These images are not particularly stable, even in the dark, when they are in contact with ambient air, which normally contains sulfur dioxide and, especially in summer, photochemically generated impurities such as ozone and/or nitrogen oxides. The images are strongly altered or even destroyed in a short time when they are in contact with ambient air. These phenomena are described for example in "Ozone Problem with Epson Photo Paper", Hardcopy Supplies Journal 6 (7), 35-36 (2000).

In patent application EP 0,685,345 the addition of dithiocarbamates, thiocyanates, thiurams or sterically hindered amines to recording sheets containing nanoporous inorganic oxides or oxide/hydroxides is proposed in order to improve the stability of printed images when these are in contact with polluted ambient air.

In patent application EP 1,197,345 the addition of unsubstituted or substituted 1,3-cyclohexanedione to recording sheets for ink jet printing containing nanoporous inorganic oxides or oxide/hydroxides is proposed in order to increase the stability of printed images when these are in contact with polluted ambient air.

In patent application EP 1,231,071 the addition of the salts copper(l) chloride, copper(l) bromide or copper(l) sulfite monohydrate to recording sheets for ink jet printing containing nanoporous inorganic oxides or oxide/hydroxides is proposed in order to increase the stability of printed images when these are in contact with polluted ambient air.

All these proposed additives however do not sufficiently increase the stability of printed images on recording sheets for ink jet printing containing nanocrystalline, nanoporous inorganic compounds when these are in contact with polluted ambient air. In particular, all reducing additives are quickly oxidized by oxygen or the impurities contained in the ambient air and therefore rapidly loose their stabilizing behavior. Some of the proposed additives may also be transformed into colored compounds when they are in contact with ambient air, leading to an unwanted degradation of the brightness of the recording sheets or of the images printed thereon.

Patent application DE 10,020,346 describes a recording sheet containing nanocrystalline, nanoporous silicium dioxide, where the primary particles have a size of not more than 20 nm, and proposes to modify the surface of the silicium dioxide with polyaluminum hydroxychloride in order to increase the stability of printed images when they are in contact with ambient air. The polyaluminum hydroxychloride may contain polynuclear aluminum hydroxo cations such as $[Al_6(OH)_{15}]^{3+}$, $[Al_8(OH)_{20}]^{4+}$, $[Al_{13}(OH)_{34}]^{5+}$ or $[Al_{21}(OH)_{60}]^{3+}$.

Patent application EP 1,437,228 describes a recording sheet containing nanocrystalline, nanoporous aluminum oxide or aluminum oxide/hydroxide and proposes to modify the surface of the aluminum oxide or aluminum oxide/hydroxide with aluminum chlorohydrate of formula $Al_2(OH)_5Cl.2.5\ H_2O$ in order to increase the stability of printed images when they are in contact with ambient air.

The proposed methods of surface modification do not sufficiently increase the stability of printed images on recording sheets for ink jet printing containing nanocrystalline, nanoporous inorganic compounds when these are in contact with polluted ambient air. Furthermore, the reproducibility of the surface modification is not sufficient, because aluminum chlorohydrate as well as polyaluminum hydroxychloride are mixtures of not very well defined compounds. They also contain inactive ingredients.

In "Polyaluminum Chlorides" in "Kirk-Othmer Encyclopedia of Chemical Technology", Volume 2, pages 338-345 (1992), ISBN 0-471-52670-3, the nature of the Al species in polyaluminum chloride products is discussed. This nature is not fully understood, but it appears that there are three or four species or molecular weight categories: monomers, a dimer, an $Al_{13}$ polymer, and several higher Al polymers. The monomeric species $Al(H_2O)_6^{3+}$, $Al(OH)(H_2O)_5^{2+}$ and $Al(OH)_2(H_2O)_{4+}$ seem to be known, as well as the dimer $Al_2(OH)_2(H_2O)_8^{4+}$ and the polymeric ion $Al_{13}O_4(OH)_{24}(H_2O)_{12}^{7+}$. Characterization of aluminum chlorohydrate has revealed a predominance (about 88%) of $Al_{13}$ polymer with the balance being monomers and smaller polycations.

P. M. Bertsch and D. R. Parker also discuss in "Aqueous Polynuclear Aluminum Species" in "The Environmental Chemistry of Aluminum", Editor G. Sposito, CRC Press, second edition, pages 117-168 (1996), ISBN 1-56670-030-2, the nature of polynuclear hydrolytic aluminum species. They state that despite several decades of active research, considerable disagreement concerning which of various polynuclear hydroxo-Al species are truly significant persists.

The polynuclear aluminum hydroxo complex $Al_{30}$ having a polycation with 30 aluminum atoms has been described by G. Allouche, C. Gérardin, T. Loiseau, G. Féray and F. Taulelle in "$Al_{30}$: A Giant Aluminium Polycation", Angewandte Chemie 112, 521-524 (2000). They assign to $Al_{30}$ the formula $[Al_{30}O_8(OH)_{56}(H_2O)_{24}]^{18+}$.

The polynuclear aluminum hydroxo complex $Al_{30}$ having a polycation with 30 aluminum atoms has also been described by J. Rowsell and L. F. Lazar in "Speciation and Thermal Transformation in Alumina Sols: Structures of the Polyhydroxyoxoaluminum Cluster $[Al_{30}O_8(OH)_{56}(H_2O)_{26}]^{18+}$ and its δ-Keggin Moieté", Journal of the American Chemical Society 122, 3777-3778 (2000). They assign to $Al_{30}$ the formula $[Al_{30}O_8(OH)_{56}(H_2O)_{26}]^{18+}$. The authors declare: "Despite over 50 years of research, only one ubiquitous polyoxocation has ever been unambiguously characterized, namely the hydroxo complex with 13 aluminum atoms. Only circumstantial evidence exists for other species."

There is therefore still a need to improve, in addition to the ink absorption capacity, the image quality, the water fastness, the light stability etc. of recording sheets containing nanocrystalline, nanoporous inorganic compounds, in particular the storage stability of images printed onto such recording sheets when they are in contact with ambient air containing impurities such as ozone, nitrogen oxides or sulfur dioxide.

SUMMARY OF THE INVENTION

An objective of the invention is to provide recording sheets consisting of a support having coated thereon at least one ink receiving layer containing nanocrystalline, nanoporous inorganic compounds, with improved storage stability of the printed images when these are in contact with ambient air. Images recorded thereon may be observed by both reflected and transmitted light.

We have now surprisingly found that the storage stability of images printed onto such recording sheets for ink jet printing, when they are in contact with polluted ambient air, is significantly improved when the recording sheet comprises, in addition to the nanocrystalline, nanoporous inorganic compounds, the polynuclear aluminum hydroxo complex with 30 aluminum atoms, added as pure compound (solid or aqueous solutions). Images printed onto such recording sheets according to the invention show considerably less change of colors and/or dye losses when they are in contact with ambient air containing impurities such as ozone, nitrogen oxides or sulfur dioxide in comparison to images printed onto recording sheets not containing such an ingredient.

Particularly preferred is the polynuclear aluminum hydroxo complex $Al_{30}$ having the polycation of formula $[Al_{30}O_8(OH)_{56}(H_2O)_{24}]^{18+}$ (or $[Al_{30}O_8(OH)_{56}(H_2O)_{26}]^{18+}$.

Preferred nanoporous, nanocrystalline inorganic compounds are nanoporous, nanocrystalline silicium dioxide, nanoporous, nanocrystalline aluminum oxide or nanoporous, nanocrystalline aluminum oxide/hydroxide.

The recording sheets for ink jet printing according to the invention contain, in addition to the nanoporous, nanocrystalline inorganic compounds and the polynuclear aluminum hydroxo complex with 30 aluminum atoms, one or more binders.

DETAILED DESCRIPTION OF THE INVENTION

We have now found that the storage stability of images printed onto recording sheets for ink jet printing, when they are in contact with polluted ambient air, is significantly improved when the recording sheet comprises, in addition to the nanocrystalline, nanoporous inorganic compounds, the polynuclear aluminum hydroxo complex with 30 aluminum atoms.

It has been found that only the addition of nanocrystalline, nanoporous inorganic compounds having a pore volume of μ20 ml/100 g, as determined by the BET isotherm method, to the ink receiving layers of recording sheets for ink jet printing considerably increases the absorption rate and the absorption capacity for aqueous inks. BET is a method for the determination of the specific surface of a powdery substance by gas absorption, wherein the specific surface is calculated from an adsorption isotherm. Only such nanocrystalline, nanoporous inorganic compounds should be considered as being "nanoporous" from now on.

The synthesis and the structure of the polynuclear aluminum hydroxo complex $Al_{13}$ having a polycation with 13 aluminum atoms has been described by G. Johansson, "On the Crystal Structure of some Basic Aluminium Salts", Acta Chemica Scandinavica 14, 771-773 (1960), by G. Johansson, "On the Crystal Structure of the Basic Aluminium Sulfate $13.Al_2O_3.6\ SO_3. xH_2O$", Arkiv för kemi 20, 321-342 (1963) and by G. Johansson, "The Crystal Structure of a Basic Aluminium Selenate", Arkiv för kemi 20, 305-319 (1963).

The synthesis and the structure of the polynuclear aluminum hydroxo complex $Al_{30}$ having a polycation with 30 aluminum atoms has been described by G. Allouche, C. Gérardin, T. Loiseau, G. Féray and F. Taulelle, "$Al_{30}$: A Giant Aluminium Polycation", Angewandte Chemie 112, 521-524 (2000) and by J. Rowsell and L. F. Lazar, "Speciation and Thermal Transformation in Alumina Sols: Structures of the Polyhydroxyoxoaluminum Cluster $[Al_{30}O_8(OH)_{56}(H_2O)_{26}]^{18+}$ and its δ-Keggin Moi-eté", Journal of the American Chemical Society 122, 3777-3778 (2000).

The amount of the polynuclear aluminum hydroxo complex with 30 aluminum atoms is from 0.01 to 0.8 mole percent relative to the nanocrystalline, nanoporous inorganic compound, preferably from 0.1 to 0.6 mole percent relative to the nanocrystalline, nanoporous inorganic compound. The range from 0.1 to 0.4 mole percent is particularly preferred.

The polynuclear aluminum hydroxo complex with 30 aluminum atoms may be added to the coating compositions of the nanoporous recording sheets as a solid or as an aqueous solution. It is also possible to incorporate the polynuclear aluminum hydroxo complex with 30 aluminum atoms into the recording sheets according to the invention by immersing these into an aqueous solution of the polynuclear aluminum hydroxo complex. The aqueous solution of the polynuclear aluminum hydroxo complex may also be applied using spray techniques or by a doctor blade coater.

The polynuclear aluminum hydroxo complex with 30 aluminum atoms is preferably added in the form of a solid or of an aqueous solution to the aqueous dispersions of the nanocrystalline, nanoporous inorganic compounds, keeping the resulting mixture at an elevated temperature for a certain time and subsequently adding the other ingredients such as binders, wetting agents etc. Preferably, the aqueous solution of the polynuclear aluminum hydroxo complex, as obtained during the preparation of the polynuclear aluminum hydroxo complex with 30 aluminum atoms, is used directly.

Nanocrystalline, nanoporous silicium dioxide, nanocrystalline, nanoporous aluminum oxide and nanocrystalline, nanoporous aluminum oxide/hydroxide may be used as nanocrystalline, nanoporous inorganic compounds. Particularly suitable are nanocrystalline, nanoporous inorganic compounds having their isoelectric point below a value of pH of 4.0.

The nanocrystalline, nanoporous aluminum oxide/hydroxide very often used in recording sheets is normally prepared in a sol-gel process, as described for example in the book by C. F. Brinker and G. W. Scherer, "Sol-Gel Science", Academic Press, 1990, ISBN 0-12-134970-5, pages 59-78. The addition of an aqueous acid, for example nitric acid, acetic acid or lactic acid, is always a step of the preparation process, either during or after hydrolysis of aluminum isopropoxide.

Patent DE 3,823,895 describes a process for the preparation of colloidal aluminum oxide/hydroxide, wherein the whole sol-gel preparation process takes place in the absence of acids.

Nanocrystalline, nanoporous aluminum oxide or aluminum oxide/hydroxide prepared in the complete absence of acids are preferred.

Preferred as nanocrystalline, nanoporous aluminum oxide is $\gamma$-$Al_2O_3$ and as nanocrystalline, nanoporous AlOOH an AlOOH reacted with salts of the rare earth metal series as described in patent application EP 0,875,394. This nanocrystalline, nanoporous aluminum oxide/hydroxide contains one or more elements of the rare earth metal series of the periodic system of the elements with atomic numbers 57 to 71, preferably in a quantity from 0.2 to 2.5 mole percent relative to $Al_2O_3$. Especially preferred as nanocrystalline, nanoporous aluminum oxide/hydroxide is pseudoboehmite, an agglomerate of aluminum oxide/hydroxide of formula $Al_2O_3 \cdot n\ H_2O$ where n is from 1 to 1.5, or pseudo-boehmite reacted with the salts of the rare earth metal series as also described in patent application EP 0,875,394. This nanocrystaline, nanoporous pseudo-boehmite contains one or more elements of the rare earth metal series of the periodic system of the elements with atomic numbers 57 to 71, preferably in a quantity from 0.2 to 2.5 mole percent relative to $Al_2O_3$.

Nanocrystalline, nanoporous silicium dioxide is another preferred nanocrystalline, nanoporous inorganic compound in recording sheets for ink jet printing.

Two different kinds of nanocrystalline, nanoporous silicium dioxide may be used, either silicium dioxide precipitated in a wet process from a solution, or fumed silicium dioxide prepared in a dry process. This fumed silicium dioxide is normally prepared in a gas phase reaction, for example by burning silicium tetrachloride in the presence of hydrogen and oxygen. Aerosil 200 ($SiO_2$ having its isoelectric point at a value of pH of 2.0), available from DEGUSSA AG, Frankfurt/Main, Germany, is an example of fumed silicium dioxide.

In a preferred embodiment of the invention, the recording sheet according to the invention contains, in addition to the nanocrystalline, nanoporous inorganic compounds and the polynuclear aluminum hydroxo complex with 30 aluminum atoms, salts of monovalent copper such as copper(1) chloride, copper(1) bromide or copper(1) sulfite monohydrate as described in patent application EP 1,231,071.

It is especially preferred if, in addition to the nanocrystalline, nanoporous inorganic compounds and the polynuclear aluminum hydroxo complex with 30 aluminum atoms and the salts of monovalent copper, compounds of formulas Ia (diketo form) and Ib (enol form), as described in patent application EP 1'197'345, are incorporated into the recording sheet,

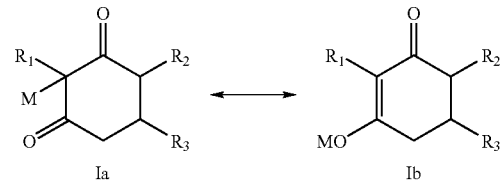

wherein in formulas Ia and Ib

M represents a hydrogen cation, a metal cation such as Li, Na or K, a triethanolamine cation or an ammonium cation optionally substituted by one or more alkyl or substituted alkyl groups each having from 1 to 18 C atoms;

$R_1$ represents hydrogen, alkyl with 1 to 12 C atoms or substituted alkyl with 2 to 6 C atoms, wherein the substituents are selected from the group consisting of CN, COOH, OH and $COOR_4$, where $R_4$ represents alkyl with 1 to 12 C atoms and $R_2$, $R_3$ independently represent hydrogen, alkyl with 1 to 6 C atoms or substituted alkyl with 2 to 6 C atoms, wherein the substituents are selected from the group consisting of CN, COOH, OH and $COOR_5$, where $R_5$ represents alkyl with 1 to 12 C atoms.

In a further preferred embodiment of the invention, the recording sheet contains, in addition to the nanocrystalline, nanoporous inorganic compounds and the polynuclear aluminum hydroxo complexes with 30 aluminum atoms, organic sulfur compounds as for example thiodiethylene glycol.

The binders are in most cases water-soluble polymers. Especially preferred are film forming polymers.

The water soluble polymers include for example natural polymers or modified products thereof such as albumin, gelatin, casein, starch, gum arabicum, sodium or potassium alginate, hydroxyethyl cellulose, carboxymethyl cellulose, $\alpha$-, $\beta$- or $\gamma$-cyclodextrine and the like. In the case where one of the water soluble polymers is gelatin, all known types of gelatin may be used as for example acid pigskin or limed bone gelatin, acid or base hydrolyzed gelatin, but also derivatized gelatins like for instance phthalaoylated, acetylated or carbamoylated gelatin or gelatin derivatized with the anhydride of trimellitic acid.

A preferred natural binder is gelatin.

Synthetic binders may also be used and include for example polyvinyl alcohol, polyvinyl pyrrolidone, completely or partially saponified products of copolymers of vinyl acetate and other monomers; homopolymers or copolymers of unsaturated carboxylic acids such as maleic acid, (meth)acrylic acid or crotonic acid and the like; homopolymers or copolymers of sulfonated vinyl monomers such as vinylsulfonic acid, styrene sulfonic acid and the like. Furthermore homopolymers or copolymers of vinyl monomers of (meth)acrylamide; homopolymers or copolymers of other monomers with ethylene oxide; polyurethanes; polyacrylamides; water-soluble nylon type polymers; polyesters; polyvinyl lactams; acrylamide polymers; substituted polyvinyl alcohol; polyvinyl acetals; polymers of alkyl and sulfoalkyl acrylates and methacrylates; hydrolyzed polyvinyl acetates; polyamides; polyvinyl pyridines; polyacrylic acid; copolymers with maleic anhydride; polyalkylene oxides; methacrylamide copolymers and maleic acid copolymers may be used. All these polymers may also be used as mixtures.

Preferred synthetic binders are polyvinyl alcohol and polyvinyl pyrrolidone or mixtures thereof.

These polymers may be blended with water insoluble natural or synthetic high molecular weight compounds, particularly with acrylate latices or with styrene acrylate latices.

Although not specifically claimed in this invention water insoluble polymers are nevertheless considered part of the system.

The polymers mentioned above having groups with the possibility to react with a cross-linking agent may be cross-linked or hardened to form essentially water insoluble layers. Such cross-linking bonds may be either covalent or ionic. Cross-linking or hardening of the layers allows for the modification of the physical properties of the layers, like for instance their water absorption capacity or their resistance against layer damage.

The cross-linking agents or hardeners are selected depending on the type of the water-soluble polymers to be cross-linked.

Organic cross-linking agents and hardeners include for example aldehydes (such as formaldehyde, glyoxal or glutaraldehyde), N-methylol compounds (such as dimethylol urea or methylol dimethylhydantoin), dioxanes (such as 2,3-dihydroxydioxane), reactive vinyl compounds (such as 1,3,5-trisacrylolyl hexahydro-s-triazine or bis-(vinylsulfonyl) methyl ether), reactive halogen compounds (such as 2,4-dichloro-6-hydroxy-s-triazine); epoxides; aziridines; carbamoyl pyridinium compounds or mixtures of two or more of the above mentioned cross-linking agents.

Inorganic cross-linking agents or hardeners include for example chromium alum, aluminum alum or boric acid.

The layers may also contain reactive substances that cross-link the layers under the influence of ultraviolet light, electron beams, X-rays or heat.

The layers may further be modified by the addition of fillers. Possible fillers are for instance kaolin, Ca- or Ba-carbonates, silicium dioxide, titanium dioxide, bentonites, zeolites, aluminum silicate, calcium silicate or colloidal silicium dioxide. Organic inert particles such as polymer beads may also be used. These beads may consist of polyacrylates, polyacrylamides, polystyrene or different copolymers of acrylates and styrene. The fillers are selected according to the intended use of the printed images. Some of these compounds cannot be used if the printed images are to be used as transparencies. However they are of interest in cases where the printed images are be to used as remission pictures. Very often, the introduction of such fillers causes a wanted matte surface.

The recording sheets may also contain water-soluble metal salts, as for example salts of the alkaline earth metals or salts of the rare earth metal series.

The recording sheets according to the invention comprise a support having coated thereon at least one ink receiving layer, and, optionally, auxiliary layers.

A wide variety of supports are known and commonly used in the art. They include all those supports used in the manufacture of photographic materials. This includes clear films made from cellulose esters such as cellulose triacetate, cellulose acetate, cellulose propionate or cellulose acetate/butyrate, polyesters such as polyethylene terephthalate or polyethylene naphthalate, polyamides, polycarbonates, polyimides, polyolefins, polyvinyl acetals, polyethers, polyvinyl chloride and polyvinylsulfones. Polyester film supports, and especially polyethylene terephthalate or polyethylene naphthalate are preferred because of their excellent dimensional stability characteristics. The usual supports used in the manufacture of opaque photographic materials may be used including for example baryta paper, polyolefin coated papers, voided polyester as for instance Melinex® manufactured by DuPont. Especially preferred are polyolefin coated papers or voided polyester.

When such supports, in particular polyester, are used, a subbing layer is advantageously coated first to improve the bonding of the ink receiving layers to the support. Useful subbing layers for this purpose are well known in the photographic industry and include for example terpolymers of vinylidene chloride, acrylonitrile and acrylic acid or of vinylidene chloride, methyl acrylate and itaconic acid.

Uncoated papers, comprising all different types of papers, varying widely in their composition and in their properties, and pigmented papers and cast-coated papers may also be used, as well as metal foils, such as foils made from aluminum.

The layers may also be coated onto textile fiber materials consisting for example of polyamides, polyesters, cotton, viscose and wool.

The ink-receiving layers according to the invention are in general coated from aqueous solutions or dispersions containing all necessary ingredients. In many cases, wetting agents are added to those coating solutions in order to improve the coating behavior and the evenness of the layers. Besides being necessary for coating purposes, these compounds may have an influence on the image quality and may therefore be selected with this specific objective in mind. Although not specifically claimed in this invention, wetting agents nevertheless form an important part of the invention.

In addition to the above mentioned ingredients, recording sheets according to the invention may contain additional compounds aimed at further improving their performance, as for example brightening agents to improve the whiteness, such as stilbenes, coumarines, triazines, oxazoles or others compounds known to someone skilled in the art.

Light stability may be improved by adding UV absorbers such as 2-hydroxy-benzotriazoles, 2-hydroxybenzophenones, derivatives of triazine or derivatives of cinnamic acid. The amount of UV absorber may vary from 200 mg/m$^2$ to 2000 mg/m$^2$, preferably from 400 mg/m$^2$ to 1000 mg/m$^2$. The UV absorber may be added to any of the layers of the recording sheet according to the invention. It is preferred that, however, if it is added, it should be added to the topmost layer.

It is further known that images produced by ink jet printing may be protected from degradation by the addition of radical scavengers, stabilizers, reducing agents and antioxidants. Examples of such compounds are sterically hindered phenols, sterically hindered amines, chromanols, ascorbic acid, phosphinic acids and their derivatives, sulfur containing compounds such as sulfides, mercaptans, thiocyanates, thioamides or thioureas.

The above mentioned compounds may be added to the coating solutions as aqueous solutions. In the case where these compounds are not sufficiently water soluble, they may be incorporated into the coating solutions by other common techniques known in the art. The compounds may for example be dissolved in a water miscible solvent such as lower alcohols, glycols, ketones, esters, or amides. Alternatively, the compounds may be added to the coating solutions as fine dispersions, as oil emulsions, as cyclodextrine inclusion compounds or incorporated into latex particles.

Typically, the recording sheet according to the invention has a thickness in the range of 0.5 μm to 100 μm dry thickness, preferably in the range of 5 μm to 50 μm dry thickness.

The coating solutions may be coated onto the support by any number of suitable procedures. Usual coating methods include for example extrusion coating, air knife coating, doctor blade coating, cascade coating and curtain coating. The coating solutions may also be applied using spray techniques. The ink-receiving layers may be built up from several single layers that can be coated one after the other or simultaneously. It is likewise possible to coat a support on both sides with ink-receiving layers. It is also possible to coat an antistatic layer or an anticurl layer on the backside. The selected coating method however is not to be considered limiting for the present invention.

Inks for ink jet printing consist in essence of a liquid vehicle and a dye or pigment dissolved or suspended therein. The liquid vehicle for ink jet inks consists in general of water or a mixture of water and a water miscible organic solvent such as ethylene glycol, higher molecular weight glycols, glycerol, dipropylene glycol, polyethylene glycol, amides, polyvinyl pyrrolidone, N-methylpyrrolidone, cyclohexyl pyrrolidone, carboxylic acids and their esters, ethers, alcohols, organic sulfoxides, sulfolane, dimethylformamide, dimethylsulfoxide, cellosolve, polyurethanes, acrylates and the like.

The non aqueous parts of the ink generally serve as humefactants, cosolvents, viscosity regulating agents, ink penetration additives or drying agents. The organic compounds have in most cases a boiling point, which is higher than that of water. In addition, aqueous inks used for printers of the continuous stream type may contain inorganic or organic salts to increase their conductivity. Examples of such salts are nitrates, chlorides, phosphates and salts of water soluble organic acids such as acetates, oxalates and citrates. The dyes and pigments suitable for the preparation of inks useable with the recording sheets according to the invention cover practically all classes of known coloring compounds. Dyes or pigments typically used for this purpose are described in patent application EP 0'559'324. The recording sheets according to the invention are meant to be used in conjunction with most of the inks representing the state of the art.

Other additives present in inks are for instance surfactants, optical brighteners, UV absorbers, light stabilizers, biocides, precipitating agents such as multivalent metal compounds and polymeric additives.

This description of inks is for illustration only and is not to be considered as limiting for the purpose of the invention.

The present invention will be illustrated in more detail by the following examples without limiting the scope of the invention in any way.

Test Methods

Patches of the colors cyan, magenta, yellow and 1K black with densities between 0.7 and 1.6 were printed onto the recording sheets according to the invention with the ink jet printers EPSON SP 890, HP 6540, HP 8250, EPSON R 300 and Lexmark P 6250 using original inks.

The following methods were used to determine the stability of the recording sheets described in the following examples when they are in contact with ozone containing air or polluted ambient air:

1. Stability in contact with ozone containing air at high concentration

The printed samples were exposed in the dark for 15 to 60 minutes in a closed cupboard to ozone containing air (300 ppm ozone) under moderate circulation of the ozone containing air at a temperature between 20° C. and 25° C. and relative humidity between 35% and 70%.

2. Stability in contact with ambient air

The printed samples were exposed in the dark for a certain time in a closed cupboard to ambient air under moderate circulation of the polluted air at a temperature between 20° C. and 25° C. and relative humidity between 35% and 70%.

3. Stability in contact with ozone containing air at low concentration

The printed samples were exposed in the dark for 24 hours in a closed cupboard (Satra-Hampden 903) to ozone containing air (1 ppm ozone) under moderate circulation of the ozone containing air at a temperature of 20° C. and relative humidity of 50%.

The densities of the printed patches were measured with an X-Rite® densitometer before and after storage. Density losses for the exposure to ozone containing air at high concentration (Test method 1) and exposure to ambient air (Test method 2) are expressed as percent loss of initial density of the color patches and as percent loss of initial density of the cyan component of 3K black. Color patches with densities between 0.3 and 1.0 were used for the evaluation.

The densities of the printed patches were measured with an X-Rite® densitometer before and after storage. The time of exposure to the ozone containing air is given where a certain dye loss occurs. The density of the dye patches and the exposure time may vary, because the resistance of different dyes to degradation by ozone differs widely. Results are given for the dye that is most prone to ozone degradation.

EXAMPLES

Example 1

Coating Solution 38.0 g of aluminum oxide/hydroxide of formula AlOOH, prepared in the absence of acid according to the method of example 1 of patent application DE 3'823'895, were dispersed under vigorous mechanical stirring at a temperature of 40° C. in 104 g of aqueous lactic acid (1.7%). Vigorous mechanical stirring was continued for a further 2 hours. Afterwards, 11.4 g of a solution (10%) of polyvinyl alcohol with a hydrolysis degree of 88% (molecular weight 72'000, available as Mowiol 2688 from Clariant AG, Muttenz, Switzerland) and 25.4 g of a solution (9%) of polyvinyl alcohol with a hydrolysis degree of 98% (molecular weight 195'000, available as Mowiol 5698 from Clariant A G, Muftenz, Switzerland) were added. The total weight of the coating solution was adjusted to 200 g with deionized water and the solution was exposed to ultrasound for 30 seconds.

Coating 140 g/m$^2$ of the coating solution were coated at a temperature of 40° C. onto a polyethylene coated paper support. The coated support was then dried for 60 minutes at a temperature of 30° C. 1 m$^2$ of the coated support contains 21.1 g of nanocrystalline, nanoporous aluminum oxide/hydroxide, calculated as $Al_2O_3$, and 2.39 g of polyvinyl alcohol.

Addition of the Polynuclear Aluminum Hydroxo Complex $Al_{30}$ 15 micromoles of the polynuclear aluminum hydroxo complex $Al_{30}$ in aqueous solution were applied to a sheet of size A5 of this recording sheet using a doctor blade coater. Afterwards the recording sheet was dried again. The aqueous solution of the polynuclear aluminum hydroxo complex $Al_{30}$ was prepared according to the method described by J. Rowsell and L. F. Lazar, "Speciation and Thermal Transformation in Alumina Sols: Structures of the Polyhydroxyoxoaluminum Cluster $[Al_{30}O_8(OH)_{56}(H_2O)_{26}]^{18+}$ and its δ-Keggin Moieté", Journal of the American Chemical Society 122, 3777-3778 (2000).

Comparative Example C-1

An aqueous solution of sodium chloride having the same concentration and the same value of pH as the aqueous solution of the aluminum hydroxo complex $Al_{30}$ was applied to the recording sheet of example 1 in place of the aqueous solution of the aluminum hydroxo complex $Al_{30}$. Afterwards the recording sheet was dried again.

Example 2

28 micromoles of the polynuclear aluminum hydroxo complex $Al_{13}$ in aqueous solution were applied to a sheet of size A5 of the recording sheet of example 1 using a doctor blade coater. Afterwards the recording sheet was dried again. The aqueous solution of the polynuclear aluminum hydroxo complex $Al_{13}$ was prepared according to the method described by G. Johansson, "On the Crystal Structure of some Basic Aluminium Salts", Acta Chemica Scandinavica 14, 771-773 (1960).

Example 3

Preparation of an Aqueous Dispersion of Negatively Charged $SiO_2$ (13.5% by Weight)

1.48 g of sodium hydroxide were dissolved under stirring in 85 g of deionized water at a temperature of 20° C. Afterwards the solution was heated to a temperature of 40° C., 13.5 g of Aerosil 200 were added, the mixture was dispersed by exposure to ultrasound and finally filtered. The resulting solution contains 13.5% by weight of negatively charged $SiO_2$.

Preparation of the Coating Solution 8.0 g of an aqueous solution of polyvinyl alcohol Mowiol 2688 (10%) and 13.33 g of an aqueous solution of polyvinyl alcohol Mowiol 5698 (9%) were mixed with 4.6 g of deionized water. Afterwards the solution was heated to a temperature of 40° C. and 74.0 g of the above aqueous dispersion of negatively charged $SiO_2$ were added under vigorous mechanical stirring. The total weight of the solution was adjusted to 100 g with deionized water and the mixture was dispersed by exposure to ultrasound.

Coating 180 g/m² of this coating solution were coated at a temperature of 40° C. onto a polyethylene coated paper support. The coated support was then dried for 60 minutes at a temperature of 30° C. 1 m² of the coated support contains 18 g of $SiO_2$ and 3.6 g of polyvinyl alcohol.

Addition of the Polynuclear Aluminum Hydroxo Complex $Al_{30}$ 15 or 42 micromoles of the polynuclear aluminum hydroxo complex $Al_{30}$ in aqueous solution were applied to a sheet of size A5 of this recording sheet using a doctor blade coater. Afterwards the recording sheet was dried again.

Comparative Example C-3

An aqueous solution of sodium chloride having the same concentration and the same value of pH as the aqueous solution of the aluminum hydroxo complex $Al_{30}$ was applied to the recording sheet of example 3 in place of the aqueous solution of the aluminum hydroxo complex $Al_{30}$. Afterwards the recording sheet was dried again.

Example 4

28 micromoles of the polynuclear aluminum hydroxo complex $Al_{13}$ in aqueous solution were applied to a sheet of size A5 of the recording sheet of example 3 using a doctor blade coater. Afterwards the recording sheet was dried again.

Example 5

Preparation of an Aqueous Dispersion of Positively Charged $SiO_2$ by Addition of the Polynuclear Aluminum Hydroxo Complex $Al_{30}$ (13.9% by Weight)

13.9 g of Aerosil 200 were added under stirring to 86 g of an aqueous solution of the polynuclear aluminum hydroxo complex $Al_{30}$ with the polycation of formula $[Al_{30}O_8(OH)_{56}(H_2O)_{26}]^{18+}$ (1.65%) at a temperature of 20° C. Afterwards the dispersion was heated to a temperature of 40° C. and the mixture was dispersed by exposure to ultrasound.

Preparation of the Coating Solution 21.6 g of an aqueous solution of polyvinyl alcohol Mowiol 2688 (10%) were mixed with 16.3 g of deionized water. Afterwards the solution was heated to a temperature of 40° C., 62.1 g of the above aqueous dispersion of positively charged $SiO_2$ were added under vigorous mechanical stirring and the mixture was dispersed by exposure to ultrasound.

Coating 200 g/m² of this coating solution were coated at a temperature of 40° C. onto a polyethylene coated paper support. The coated support was then dried for 60 minutes at a temperature of 30° C. 1 m² of the coated support contains 17.3 g of $SiO_2$ and 4.32 g of polyvinyl alcohol.

Comparative Example C-5

Preparation of an Aqueous Dispersion of Positively Charged $SiO_2$ (11.5% by Weight)

This dispersion was prepared according to the method described in patent U.S. Pat. No. 3,007,878:

1.30 g of aluminum chlorohydrate of formula $Al_2(OH)_5Cl.2.5\ H_2O$ (Locron, available from Clariant A G, Muttenz, Switzerland) were dissolved under stirring in 87 g of deionized water at a temperature of 20° C. Afterwards the solution was heated to a temperature of 40° C., 11.5 g of Aerosil 200 were added, the mixture was dispersed by exposure to ultrasound and finally filtered.

Preparation of the Coating Solution 20.4 g of an aqueous solution of polyvinyl alcohol Moviol 2688 (10%) were mixed with 8.6 g of deionized water. Subsequently the solution was heated to a temperature of 40° C., 71.0 g of the above aqueous dispersion of positively charged $SiO_2$ were added under vigorous mechanical stirring and the mixture was dispersed by exposure to ultrasound.

Coating 182.6 g/m² of this coating solution were coated at a temperature of 40° C. onto a polyethylene coated paper support. The coated support was then dried for 60 minutes at a temperature of 30° C. 1 m² of the coated support contains 21 g of $SiO_2$ and 4.38 g of polyvinyl alcohol.

Example 6

Preparation of an Aqueous Dispersion of Positively Charged $SiO_2$ by Addition of the Polynuclear Aluminum Hydroxo Complex $Al_{30}$ (14% by Weight)

84.0 g of Cab-o-Sil M5 (available from Cabot Corporation, Billerica, USA) were added under stirring to 387.1 g of deionized water and 124.57 g of an aqueous solution (8.7%) of the polynuclear aluminum hydroxo complex $Al_{30}$ with the polycation of formula $[Al_{30}O_8(OH)_{56}(H_2O)_{26}]^{18+}$ at a temperature of 20° C. The mixture was dispersed for 10 minutes with an Ystral X-40 device (about 9000 rounds per minute). Afterwards, the dispersion was heated at a temperature of 60° C. for 60 minutes and 4.32 g of an aqueous solution (5.26%) of Olin 10 G (available from Olin Corporation, Clayton, USA) were added.

The dispersion contains 14% of silicium dioxide and 9.0 mole percent of aluminum relative to the silicium dioxide. The dispersion has a value of pH of 3.55.

Preparation of the Coating Solution 24.75 g of an aqueous solution (8%) of polyvinyl alcohol Mowiol 4088 (available from Clariant A G, Muttenz, Switzerland) were mixed with 2.32 g of deionized water. Afterwards, the solution was heated to a temperature of 40° C., 64.29 g of the above aqueous dispersion of positively charged $SiO_2$ were added under vigorous mechanical stirring. Finally, 0.72 g of an aqueous solution (5.26%) of Olin 10 G and 7.92 g of an aqueous solution (4%) of boric acid were added.

The coating solution contains 9% of silicium dioxide. The coating solution has a value of pH of 3.32.

Coating 140 g/m$^2$ of this coating solution were coated at a temperature of 40° C. onto a polyethylene coated paper support. The coated support was then dried for 60 minutes at a temperature of 30° C. 1 m$^2$ of the coated support contains 12.6 g of $SiO_2$ and 2.77 g of polyvinyl alcohol.

Comparative Example C-6

Preparation of an Aqueous Dispersion of Positively Charged $SiO_2$ (20% by Weight)

120.0 g of Cab-o-Sil M5 were added under stirring to 454.76 g of deionized water, 1.20 g of lithium carbonate and 19.73 g of aluminum chlorohydrate of formula $Al_2(OH)_5Cl.2.5\ H_2O$ (Locron, available from Clariant A G, Muttenz, Switzerland) at a temperature of 20° C. The mixture was dispersed for 10 minutes with an Ystral X-40 device (about 9000 rounds per minute). Afterwards, the dispersion was heated at a temperature of 60° C. for 60 minutes and 4.32 g of an aqueous solution (5.26%) of Olin 10 G were added.

The dispersion contains 20% of silicium dioxide and 9.0 mole percent of aluminum relative to the silicium dioxide. The dispersion has a value of pH of 3.83.

Preparation of the Coating Solution 27.72 g of an aqueous solution (8%) of polyvinyl alcohol Mowiol 4088 were mixed with 12.29 g of deionized water. Afterwards, the solution was heated to a temperature of 40° C., 50.4 g of the above aqueous dispersion of positively charged $SiO_2$ were added under vigorous mechanical stirring. Finally, 0.72 g of an aqueous solution (5.26%) of Olin 10 G and 8.87 g of an aqueous solution (4%) of boric acid were added.

The coating solution contains 10.1% of silicium dioxide. The coating solution has a value of pH of 3.68.

Coating 125 g/m$^2$ of this coating solution were coated at a temperature of 40° C. onto a polyethylene coated paper support. The coated support was then dried for 60 minutes at a temperature of 30° C. 1 m$^2$ of the coated support contains 12.6 g of $SiO_2$ and 2.77 g of polyvinyl alcohol.

Results

The density losses obtained during exposure to ozone containing air under the indicated testing condition 1 are listed in Table 4 for recording sheets containing the polynuclear aluminum hydroxo complex $Al_{13}$. The samples were exposed to the ozone containing air for 30 minutes.

TABLE 1

| Example | Quantity of $Al_{13}$ (mole percent) | Dye Density Loss in % | | |
|---|---|---|---|---|
| | | Cyan | Magenta | Yellow |
| 2 | 0.43 | 13 | 14 | 3 |
| C-1 | — | 17 | 23 | 5 |
| 4 | 0.41 | 21 | 17 | 3 |
| C-3 | — | 28 | 17 | 4 |

A comparison of the results in Table 1 immediately shows that the recording sheets for ink jet printing, where the polynuclear aluminum hydroxo complex $Al_{13}$ had been applied (Examples 2 and 4), show lower density losses in comparison to corresponding recording sheets not containing the polynuclear aluminum hydroxo complex $Al_{13}$ (Comparative examples C-1 and C-3). The improvement of the stability against ozone containing air is considerably higher with silicium dioxide as nanocrystalline, nanoporous inorganic compound than with aluminum oxide/hydroxide.

The density losses obtained during exposure to ozone containing air under the indicated testing condition 1 are listed in Table 2 for recording sheets according to the invention containing the polynuclear aluminum hydroxo complex $Al_{30}$. The samples were exposed to the ozone containing air for 30 minutes.

TABLE 2

| Example | Quantity of $Al_{30}$ (mole percent) | Dye Density Loss in % | | |
|---|---|---|---|---|
| | | Cyan | Magenta | Yellow |
| 1 | 0.18 | 9 | 12 | 2 |
| C-1 | — | 17 | 23 | 5 |
| 3 | 0.18 | 12 | 8 | 5 |
| C-3 | — | 28 | 17 | 4 |

A comparison of the results in Table 2 immediately shows that the recording sheets for ink jet printing according to the invention, where the polynuclear aluminum hydroxo complex $Al_{30}$ had been applied (Examples 1 and 3), show considerably lower density losses in comparison to corresponding recording sheets not containing the polynuclear aluminum hydroxo complex $Al_{30}$ (Comparative examples C-1 and C-3). The improvement of the stability against ozone containing air is considerably higher with silicium dioxide as nanocrystalline, nanoporous inorganic compound than with aluminum oxide/hydroxide.

The density losses obtained during exposure to ozone containing air under the indicated testing condition 1 are listed in Table 3 for a recording sheet according to the invention containing the polynuclear aluminum hydroxo complex $Al_{30}$. The samples were exposed to the ozone containing air for 60 minutes.

TABLE 3

| Example | Quantity of $Al_{30}$ (mole percent) | Dye Density Loss in % | | |
|---|---|---|---|---|
| | | Cyan | Magenta | Yellow |
| 5 | 0.26 | 2 | 3 | 7 |
| C-5 | — | 4 | 6 | 3 |

A comparison of the results in Table 3 immediately shows that the recording sheet for ink jet printing according to the invention containing the polynuclear aluminum hydroxo complex $Al_{30}$ (Example 5) shows considerably lower density losses of the dyes cyan and magenta in comparison to a corresponding recording sheet, where the surface of the silicium dioxide had been modified with aluminum chlorohydrate (Comparative example C-5).

The density losses obtained during exposure to ambient air under the indicated testing condition 2 are listed in Table 4 for recording sheets according to the invention containing the polynuclear aluminum hydroxo complex $Al_{30}$. The samples were exposed to ambient air for 3 days.

TABLE 4

| Example | Quantity of $Al_{30}$ (mole percent) | Dye Density Loss in % | | | |
|---|---|---|---|---|---|
| | | Cyan | Magenta | Yellow | Black |
| 3 | 0.50 | 7 | 0 | 0 | 9 |
| C-3 | — | 16 | 6 | 0 | 18 |

A comparison of the results in Table 4 immediately shows that the recording sheet for ink jet printing according to the invention, where the polynuclear aluminum hydroxo complex $Al_{30}$ had been applied (Example 3), shows considerably lower density losses in comparison to a corresponding recording sheet not containing the polynuclear aluminum hydroxo complex $Al_{30}$ (Comparative example C-3).

The density losses obtained during exposure to ambient air under the indicated testing condition 2 are listed in Table 5 for a recording sheet according to the invention containing the polynuclear aluminum hydroxo complex $Al_{30}$. The samples were exposed to ambient air for 3 days.

TABLE 5

| Example | Quantity of $Al_{30}$ (mole percent) | Dye Density Loss in % | | | |
|---|---|---|---|---|---|
| | | Cyan | Magenta | Yellow | Black |
| 5 | 0.26 | 2 | 0 | 0 | 3 |
| C-5 | — | 5 | 3 | 0 | 5 |

A comparison of the results in Table 5 immediately shows that the recording sheet for ink jet printing according to the invention, where the polynuclear aluminum hydroxo complex $Al_{30}$ had been applied (Example 5), shows considerably lower density losses in comparison to a corresponding recording sheet where the surface of the silicium dioxide had been modified with aluminum chlorohydrate (Comparative example C-5).

The time for the loss of 25% of density of a magenta patch of density 25% printed with the ink jet printer HP 6540 obtained after exposure to ozone containing air under the indicated testing condition 3 are listed in Table 6 for a recording sheet according to the invention containing the polynuclear aluminum hydroxo complex $Al_{30}$.

TABLE 6

| Example | Quantity of Al (mole percent) relative to silicium dioxide | Time (hours) |
|---|---|---|
| 6 | 4.5 | 4.9 |
| C-6 | 4.5 | 2.5 |

A comparison of the results in Table 6 immediately shows that the recording sheet for ink jet printing according to the invention containing the polynuclear aluminum hydroxo complex $Al_{30}$ (Example 6) shows a much higher exposure time to ozone containing air until a density loss of 25% occurs in comparison to a corresponding recording sheet, where the surface of the silicium dioxide had been modified with aluminum chlorohydrate (Comparative example C-6).

The time for the loss of 20% of density of a magenta patch of density 90% printed with the ink jet printer HP 8250 obtained after exposure to ozone containing air under the indicated testing condition 3 are listed in Table 7 for a recording sheet according to the invention containing the polynuclear aluminum hydroxo complex $Al_{30}$.

TABLE 7

| Example | Quantity of Al (mole percent) relative to silicium dioxide | Time (hours) |
|---|---|---|
| 6 | 4.5 | 16.9 |
| C-6 | 4.5 | 8.1 |

A comparison of the results in Table 7 immediately shows that the recording sheet for ink jet printing according to the invention containing the polynuclear aluminum hydroxo complex $Al_{30}$ (Example 6) shows a much higher exposure time to ozone containing air until a density loss of 20% occurs in comparison to a corresponding recording sheet, where the surface of the silicium dioxide had been modified with aluminum chlorohydrate (Comparative example C-6).

The time for the loss of 10% of density of a 1 K black patch of density 90% printed with the ink jet printer EPSON R 300 obtained after exposure to ozone containing air under the indicated testing condition 3 are listed in Table 8 for a recording sheet according to the invention containing the polynuclear aluminum hydroxo complex $Al_{30}$.

TABLE 8

| Example | Quantity of Al (mole percent) relative to silicium dioxide | Time (hours) |
|---|---|---|
| 6 | 4.5 | 11.2 |
| C-6 | 4.5 | 4.4 |

A comparison of the results in Table 8 immediately shows that the recording sheet for ink jet printing according to the invention containing the polynuclear aluminum hydroxo complex $Al_{30}$ (Example 6) shows a much higher exposure time to ozone containing air until a density loss of 10% occurs in comparison to a corresponding recording sheet, where the surface of the silicium dioxide had been modified with aluminum chlorohydrate (Comparative example C-6).

The time for the loss of 25% of density of a magenta patch of density 90% printed with the ink jet printer LEXMARK P 6250 obtained after exposure to ozone containing air under the indicated testing condition 3 are listed in Table 9 for a recording sheet according to the invention containing the polynuclear aluminum hydroxo complex $Al_{30}$.

TABLE 9

| Example | Quantity of Al (mole percent) relative to silicium dioxide | Time (hours) |
|---|---|---|
| 6 | 4.5 | 6.3 |
| C-6 | 4.5 | 3.1 |

The results presented in Tables 9 immediately shows that the recording sheet for ink jet printing according to the invention containing the polynuclear aluminum hydroxo complex $Al_{30}$ (Example 6) shows a much higher exposure time to ozone containing air until a density loss of 25% occurs in comparison to a corresponding recording sheet, where the surface of the silicium dioxide had been modified with aluminum chlorohydrate (Comparative example C-6).

A comparison of the results in Tables 6 to 9 immediately shows that the exposure time to ozone containing air (Testing condition 3) is roughly doubled for recording sheets for ink jet printing according to the invention, where the surface of the silicium dioxide has been modified by a treatment with the polynuclear aluminum hydroxo complex $Al_{30}$ in comparison to corresponding recording sheets for ink jet printing, where the surface of the silicium dioxide had been modified by a treatment with aluminum chlorohydrate.

Finally, variations from the examples given herein are possible in view of the above disclosure. Therefore, although the invention has been described with reference to certain preferred embodiments, it will be appreciated that other materials may be devised, which are nevertheless within the scope and spirit of the invention as defined in the claims appended herein.

The foregoing description of various and preferred embodiments of the invention has been provided for purposes of illustration only, and it is understood that various modifications, variations and alterations may be made without departing from the scope and spirit of the invention as set forth in the following claims.

The invention claimed is:

1. Recording sheet for ink jet printing having coated onto a support at least one ink-receiving layer consisting of binders and at least one nanocrystalline, nanoporous inorganic compound prepared in the absence of acids, wherein the recording sheet contains the polynuclear aluminum hydroxo complex $Al_{30}$ with 30 aluminum atoms which was combined with an aqueous dispersion of $SiO_2$ and heated for at least 60 minutes at a temperature of 60° C. to produce the coated recording sheet having improved storage stability of the printed images thereon when in contact with ambient air.

2. The recording sheet according to claim 1, wherein said polynuclear aluminum hydroxo complex is present from 0.01 to 0.8 mole percent relative to the quantity of the nanocrystalline, nanoporous inorganic compounds.

3. The recording sheet according to claim 1, wherein said polynuclear aluminum hydroxo complex is present from 0.1 to 0.6 mole percent relative to the quantity of the nanocrystalline, nanoporous inorganic compounds.

4. The recording sheet according to claim 1, wherein said polynuclear aluminum hydroxo complex is added to an aqueous dispersions of the nanocrystalline, nanoporous inorganic compounds as an aqueous solution.

5. The recording sheet according to claim 1, wherein said polynuclear aluminum hydroxo complex is coated over said ink-receiving layer.

6. The recording sheet according to claim 1, wherein said nanocrystalline, nanoporous inorganic compound is silicium dioxide.

7. The recording sheet according to claim 6, wherein said silicium dioxide is fumed silica prepared in a gas phase reaction.

8. The recording sheet according to claim 1, wherein said nanocrystalline, nanoporous inorganic compound is aluminum oxide or aluminum oxide/hydroxide comprising one or more of the elements of the rare earth metal series of the periodic system of the elements with atomic numbers 57 to 71 in an amount of from 0.2 to 2.5 mole percent relative to $Al_2O_3$.

9. The recording sheet according to claim 1, wherein said support is selected from the group consisting of coated paper, uncoated paper, transparent polyester, opaque polyester or fibrous textile materials.

10. The recording sheet according to claim 1, further containing organic sulfur compounds.

11. The recording sheet according to claim 1, wherein said binder is a water-soluble polymer.

12. The recording sheet according to claim 1, wherein said binder is selected from the group consisting of albumin, gelatin, casein, starch, gum arabicum, sodium alginate, potassium alginate, hydroxyethyl cellulose, carboxymethyl cellulose, α-cyclodextrine, β-cyclodextrine, γ-cyclodextrine, acid pigskin gelatin, limed bone gelatin, acid hydrolyzed gelatin, base hydrolyzed gelatin, phthalaoylated gelatin, acetylated gelatin, carbamoylated gelatin, gelatin derivatized with the anhydride of trimellitic acid, polyvinyl alcohol, polyvinyl pyrrolidone, completely or partially saponified products of copolymers of vinyl acetate; maleic acid, (meth)acrylic acid or crotonic acid; vinylsulfonic acid, styrene sulfonic acid; homopolymers or copolymers of vinyl monomers of (meth) acrylamide; homopolymers or copolymers of other monomers with ethylene oxide; polyurethanes; polyacrylamides; water-soluble nylon type polymers; polyesters; polyvinyl lactams; acrylamide polymers; substituted polyvinyl alcohol; polyvinyl acetals; polymers of alkyl and sulfoalkyl acrylates and methacrylates; hydrolyzed polyvinyl acetates; polyamides; polyvinyl pyridines; polyacrylic acid; copolymers with maleic anhydride; polyalkylene oxides; methacrylamide copolymers and maleic acid copolymers.

13. The recording sheet according to claim 12, wherein said ink-receiving layer comprises a mixture of at least two binders.

14. The recording sheet according to claim 1, further comprising a cross-linking agent.

15. The recording sheet according to claim 1, wherein said cross-linking agent is selected from the group consisting of aldehydes, N-methylol compounds, dioxanes, reactive vinyl compounds, reactive halogen compounds, epoxides; aziridines, carbamoyl pyridinium compounds, chromium alum, aluminum alum and boric acid.

16. The recording sheet according to claim 15, wherein said cross-linking agent is selected from the group consisting of formaldehyde, glyoxal, mglutaraldehyde, dimethylol urea, methylol dimethylhydantoin, 2,3-dihydroxydioxane, 1,3,5-trisacroyl hexahydro-s-triazine, bis-(vinylsulfonyl)methyl ether and 2,4-dichloro-6-hydroxy-s-triazine.

17. The recording sheet according to claim 1, wherein the recording sheet contains a mixture of at least two nanocrystalline, nanoporous inorganic compounds.

18. The recording sheet according to claim 1, further comprising additional ink-receiving layers.

19. Pigment containing compositions for the preparation of ink-receiving layers for recording sheets for ink jet printing according to claim 1.

20. A method of preparing a recording sheet for ink jet printing with improved storage stability comprising the steps of:
adding an aqueous dispersion of $SiO_2$ to an aqueous solution of a nanocrystalline, nanoporous inorganic compound comprising a polynuclear aluminum hydroxo complex $Al_{30}$ with 30 aluminum atoms, at a temperature of 20° C. to create a mixture;
dispersing said mixture to form a dispersion;

heating said dispersion for at least sixty minutes at a temperature of 60° C. to produce an aqueous dispersion of positively charged $SiO_2$;

combining said dispersion with an aqueous solution of polyvinyl alcohol and an aqueous solution of boric acid to produce an ink receiving coating solution;

coating said solution on a support; and drying said solution forming the ink receiving layer to produce a coated recording sheet for ink jet printing having improved storage stability of the printed images thereon when in contact with ambient air.

* * * * *